(12) United States Patent
Ryoo et al.

(10) Patent No.: US 9,874,127 B2
(45) Date of Patent: Jan. 23, 2018

(54) UREA INJECTION DEVICE FOR SELECTIVE CATALYST REDUCTION DEVICE

(71) Applicant: Hyundai Motor Company, Seoul (KR)

(72) Inventors: Dong Myoung Ryoo, Whasung-Si (KR); Chang Ho Ham, Whasung-Si (KR); Buyeol Ryu, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 144 days.

(21) Appl. No.: 14/328,373

(22) Filed: Jul. 10, 2014

(65) Prior Publication Data
US 2015/0159531 A1    Jun. 11, 2015

(30) Foreign Application Priority Data
Dec. 5, 2013    (KR) .......................... 10-2013-0150699

(51) Int. Cl.
*F01N 3/20*    (2006.01)
*B60K 15/035*    (2006.01)

(52) U.S. Cl.
CPC ...... *F01N 3/2066* (2013.01); *B60K 15/03504* (2013.01); *B60K 15/03519* (2013.01); *B60K 2015/03509* (2013.01); *B60K 2015/03514* (2013.01); *F01N 2610/01* (2013.01); *F01N 2610/02* (2013.01); *F01N 2610/1413* (2013.01); *F01N 2610/1426* (2013.01);
(Continued)

(58) Field of Classification Search
CPC ........... F01N 3/2066; F01N 2610/1413; F01N 2610/1466; F01N 2610/1426; F01N 2610/02; F01N 2610/01; F02M 25/08; F02M 25/0872; F02M 25/089; B60K 15/035; B60K 15/03519; B60K 15/03504; B60K 2015/03509; B60K 2015/03514
USPC ....... 137/171, 173, 197–199, 574, 587, 588, 137/589; 251/127; 60/295, 286, 301, 60/303; 123/518, 519
See application file for complete search history.

(56) References Cited

U.S. PATENT DOCUMENTS 3,800,978 A * 4/1974 Sigwald ............... B60K 15/035
                                                    137/587
3,910,302 A * 10/1975 Sudhir ............. B60K 15/03519
                                                    137/202
(Continued)

FOREIGN PATENT DOCUMENTS

JP          6-16816 Y2      5/1994
JP          08-014129 A     1/1996
(Continued)

*Primary Examiner* — Ian Paquette
(74) *Attorney, Agent, or Firm* — Morgan Lewis & Bockius LLP

(57) ABSTRACT

Disclosed is a urea injection device for a selective catalyst reduction device. The urea injection device for a selective catalyst reduction device serves to inject urea into a urea tank through a urea injection port and a urea injection line that connects the urea injection port and the urea tank. The urea injection device may include: i) a leveling pipe which is connected with the urea tank, ii) a separator which is installed to be connected with the leveling pipe, and connected to the urea injection port through a gas recirculation line, iii) a gas vent line which is connected with the separator, and iv) a check valve which is installed in the gas vent line.

13 Claims, 7 Drawing Sheets

(52) U.S. Cl.
CPC ....... *F01N 2610/1466* (2013.01); *Y02T 10/24* (2013.01); *Y10T 137/309* (2015.04)

(56) References Cited

U.S. PATENT DOCUMENTS

| | | | | |
|---|---|---|---|---|
| 4,958,655 | A * | 9/1990 | Danek | B60K 15/035 123/516 |
| 5,584,278 | A * | 12/1996 | Satoh | B60K 15/03519 123/516 |
| 6,000,426 | A * | 12/1999 | Tuckey | B60K 15/035 123/516 |
| 6,017,061 | A * | 1/2000 | Adachi | B60K 15/035 137/588 |
| 6,338,369 | B1 * | 1/2002 | Shermer | B67D 7/0486 141/59 |
| 8,413,431 | B2 | 4/2013 | Erdmann et al. | |
| 2006/0048823 | A1 * | 3/2006 | Hagano | B60K 15/03519 137/557 |
| 2008/0184972 | A1 * | 8/2008 | Ehrman | B60K 15/03504 123/518 |
| 2011/0005210 | A1 * | 1/2011 | Erdmann | B60K 15/03519 60/295 |
| 2012/0186677 | A1 | 7/2012 | Wetzel et al. | |
| 2015/0167529 | A1 * | 6/2015 | Lee | B60K 15/03519 60/295 |

FOREIGN PATENT DOCUMENTS

| | | |
|---|---|---|
| JP | 2004-108185 A | 4/2004 |
| JP | 2012-132388 A | 7/2012 |
| KR | 10-2008-0104162 A | 12/2008 |

\* cited by examiner

UREA INJECTION DEVICE FOR SELECTIVE CATALYST REDUCTION DEVICE

CROSS-REFERENCE TO RELATED APPLICATION

The present application claims priority of Korean Patent Application Number 10-2013-0150699 filed on Dec. 5, 2013, the entire contents of which application are incorporated herein for all purposes by this reference.

BACKGROUND OF INVENTION

Field of Invention

The present invention relates to a urea supply system for supplying urea water solution (hereinafter, referred to as "urea") to a selective catalyst reduction (hereinafter, referred to as "SCR") device for after-treatment of exhaust gas.

Description of Related Art

Recently, as problems regarding environmental pollution have become main issues, electric vehicles, hydrogen vehicles, solar vehicles, and hybrid vehicles, which are environmentally-friendly vehicles that do not use fossil fuel, have been actively developed and commercially available in the automotive industries as well.

However, despite the appearance of the environmentally-friendly vehicles, vehicles, which use gasoline or diesel as fuel, are still mainly used, and is also expected to keep their place even in the future.

In the case of the aforementioned vehicle having an internal combustion engine that uses fossil fuel such as gasoline or diesel, there is a problem in that environmental pollution caused by exhaust gas is severe.

In general, exhaust systems of diesel engines are provided with exhaust gas after-treatment devices such as a diesel oxidation catalyst (DOC), a diesel particulate matter filter (DPF), selective catalyst reduction (SCR), and a lean NOx trap (LNT) in order to reduce pollutants such as carbon monoxide, hydrocarbon, particulate matters, and nitrogen oxide that are included in exhaust gas.

Among the aforementioned exhaust gas after-treatment devices, an exhaust gas after-treatment device using the SCR (hereinafter, referred to as "SCR device") serves to inject a reducing agent such as urea into an exhaust pipe, and reduce nitrogen oxide in the exhaust gas into nitrogen and oxygen.

That is, when the SCR device injects a reducing agent into the exhaust pipe, the reducing agent is converted into ammonia by heat of the exhaust gas, and nitrogen oxide may be reduced into nitrogen gas and water by a catalyst reaction between nitrogen oxide and ammonia in the exhaust gas which is caused by an SCR catalyst.

In order to inject the urea into the exhaust pipe, a urea supply system is required to supply the urea to the SCR device.

Meanwhile, a urea tank is provided with a urea injection device for injecting the urea into the tank, and the urea injection device is provided with a urea filler neck, and a leveling pipe that connects the urea tank and the urea filler neck.

In the urea injection device, when the urea is injected into the urea tank through the urea filler neck, ammonia gas in the urea tank may be discharged to an injection port of the urea filler neck through a leveling pipe.

The urea causes ammonia gas which is a toxic material that is harmful to the human body. Therefore, the ammonia gas, which is harmful to the human body, is excessively emitted to the injection port of the urea filler neck, and thus causing displeasure to a user, and damaging the user's health. Accordingly, ISO regulations (ISO22241-5) restrict emission concentration of ammonia gas at the urea injection port to 15 PPM or less.

Moreover, the ammonia gas in the urea tank is emitted through a ventilation valve, but the urea concentration of the urea solution deteriorates while the urea in the urea tank is exposed to the atmosphere, which may cause inferiority of the urea, which may cause the urea to be inferior and easily frozen in the winter.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a urea injection device for a selective catalyst reduction device, which may prevent ammonia gas in a urea tank when urea is injected from being excessively emitted toward a user through an injection port of a urea filler neck, and may prevent contact between the urea and the atmosphere.

In addition, the present invention has been made in an effort to provide a urea injection device for a selective catalyst reduction device, which may ensure stability of the urea injection to cope with an increase in a urea injection speed, and ensure pressure safety of a urea supply system in accordance with the urea injection.

Various aspects of the present invention provide a urea injection device for a selective catalyst reduction device, which injects urea into a urea tank through a urea injection port and a urea injection line that connects the urea injection port and the urea tank, the urea injection device including: i) a leveling pipe which is connected with the urea tank; ii) a separator which is installed to be connected with the leveling pipe, and connected to the urea injection port through a gas recirculation line; iii) a gas vent line which is connected with the separator; and iv) a check valve which is installed in the gas vent line.

In addition, in the urea injection device for a selective catalyst reduction device according to the present invention, the separator may separate urea and urea liquid from each other that flow in through the leveling pipe, discharge the urea gas to the gas recirculation line and the gas vent line, and discharge the urea liquid to the leveling pipe.

In addition, in the urea injection device for a selective catalyst reduction device according to the present invention, the check valve may selectively open or close a flow path of the gas vent line depending on pressure of the urea gas.

In addition, in the urea injection device for a selective catalyst reduction device according to the present invention, the separator may include a case body that is formed with an inlet connected with the leveling pipe, a first gas outlet connected with the gas recirculation line, and a second gas outlet connected with the gas vent line.

In addition, in the urea injection device for a selective catalyst reduction device according to the present invention, a hydrophobic mesh member, which separates urea gas from urea liquid, may be installed in the case body.

In addition, in the urea injection device for a selective catalyst reduction device according to the present invention, an internal space, which connects the inlet and the first gas outlet, may be formed in the case body.

In addition, in the urea injection device for a selective catalyst reduction device according to the present invention, the hydrophobic mesh member may be installed between the internal space and the second gas outlet.

In addition, in the urea injection device for a selective catalyst reduction device according to the present invention, a plurality of partition walls may be provided in the case body.

In addition, in the urea injection device for a selective catalyst reduction device according to the present invention, the case body may include a first body piece which is formed with the inlet, a second body piece which is formed with the first gas outlet, and a third body piece which is formed with the second gas outlet.

In addition, in the urea injection device for a selective catalyst reduction device according to the present invention, the first and second body pieces may be coupled to each other to form an internal space, and an opening end that is coupled to the third body piece.

In addition, in the urea injection device for a selective catalyst reduction device according to the present invention, a plurality of partition walls, which is disposed inside the first body piece, may be formed to be spaced apart from each other inside the second body piece.

In addition, in the urea injection device for a selective catalyst reduction device according to the present invention, the first body piece may be partitioned by the partition walls, and may be formed with a drain passage connected with the inlet.

In addition, in the urea injection device for a selective catalyst reduction device according to the present invention, a hydrophobic mesh member, which is hydrophobic and closes the opening end, may be installed in the third body piece.

In addition, in the urea injection device for a selective catalyst reduction device according to the present invention, the check valve may include: a valve housing which is formed with an inflow portion through which urea gas flows, an outflow portion through which the urea gas is discharged, and a valve passage which connects the inflow portion and the outflow portion; a diaphragm which is fixed in the valve housing to correspond to the valve passage, and is capable of being elastically deformed by pressure of the urea gas; a valve body which is fixed to the diaphragm, and selectively opens or closes the valve passage; and a spring which is installed in the valve housing, and applies elastic force to the valve body.

In addition, the urea injection device for a selective catalyst reduction device according to the present invention may further include a cap unit which is coupled to the urea injection port.

In addition, in the urea injection device for a selective catalyst reduction device according to the present invention, a positive pressure valve and a negative pressure valve may be installed in the cap unit.

In addition, in the urea injection device for a selective catalyst reduction device according to the present invention, the cap unit may include a cap housing that is formed with a main valve passage which is connected with the urea injection port, and a discharge passage which is connected with the main valve passage and discharges the urea gas.

In addition, in the urea injection device for a selective catalyst reduction device according to the present invention, the positive pressure valve may include a first opening and closing member which has a sub valve passage connected with the main valve passage and selectively opens or closes the main valve passage, and a first valve spring which is installed in the cap housing and applies elastic force to the first opening and closing member.

In addition, in the urea injection device for a selective catalyst reduction device according to the present invention, the negative pressure valve may include a second opening and closing member which selectively opens or closes the sub valve passage, and a second valve spring which is installed in the cap housing and applies elastic force to the second opening and closing member.

In addition, in the urea injection device for a selective catalyst reduction device according to the present invention, the first opening and closing member may be installed to be in close contact with an edge of the main valve passage.

In addition, in the urea injection device for a selective catalyst reduction device according to the present invention, the second opening and closing member may be installed to be in close contact with an edge of the sub valve passage.

In addition, in the urea injection device for a selective catalyst reduction device according to the present invention, the first and second opening and closing members may move in opposite directions, and open or close the main valve passage and the sub valve passage, respectively.

In addition, in the urea injection device for a selective catalyst reduction device according to the present invention, an inlet end of the gas vent line may be connected with the separator, and an outlet end of the gas vent line may be opened in a direction opposite to the urea injection port.

According to the present invention, at ordinary times or when the urea is injected at a low speed, the flow path of the gas vent line is closed by the check valve, and contact between the urea in the urea tank and the atmosphere is prevented, thereby preventing moisture in the urea from escaping into the atmosphere, preventing deterioration and inferiority of urea concentration of the urea, and preventing the urea from become frozen in the winter.

In addition, according to the present invention, when the urea is injected at a high speed, the high pressure urea gas remaining in the urea tank is discharged through the outlet end of the gas vent line in the direction opposite to the urea injection port by opening the flow path of the gas vent line by the check valve, thereby minimizing the urea gas that is discharged to the urea injection port.

In addition, according to the present invention, the high-pressure urea gas is discharged through the outlet end of the gas vent line in the direction opposite to the urea injection port, thereby preventing the urea gas from being exposed to the user and flowing into the respiratory system of the user.

Moreover, according to the present invention, the separator, which separates the urea gas and liquid discharged from the urea tank, is provided, thereby preventing the urea from being excessively injected after shutting off urea injection, and preventing the urea liquid from leaking to the outside through the gas recirculation line.

In addition, according to the present invention, when abnormal pressure occurs in the urea tank, pressure in the urea tank may be safely maintained by the positive pressure valve and the negative pressure valve of the cap unit, thereby ensuring stability of the urea injection to cope with an increase in a urea injection speed, and ensuring pressure safety of the urea supply system in accordance with the urea injection.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The drawings are intended to be used as references for describing the exemplary embodiments of the present invention, and the accompanying drawings should not be construed as limiting the technical spirit of the present invention.

DETAILED DESCRIPTION

Figure 1:
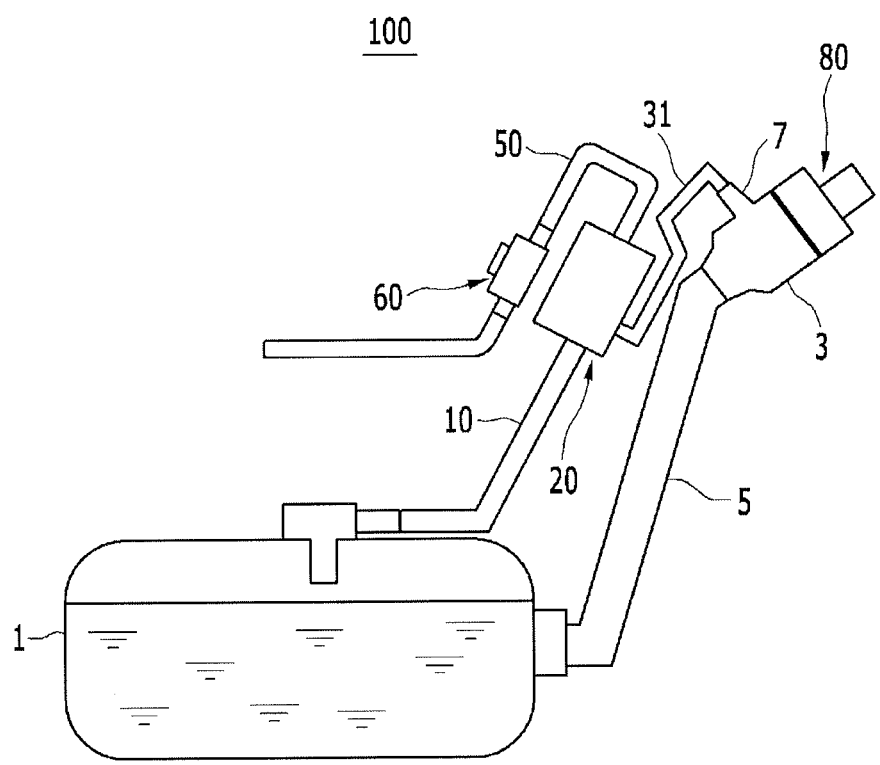
FIG. 1 is a block diagram schematically illustrating an exemplary urea injection device for a selective catalyst reduction device according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present invention, and the same or similar elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not necessarily limited to the order in the following description. Throughout the specification and the claims, unless explicitly described to the contrary, the word "comprise" and variations such as "comprises" or "comprising" will be understood to imply the inclusion of stated elements but not the exclusion of any other elements.

Figure 2:
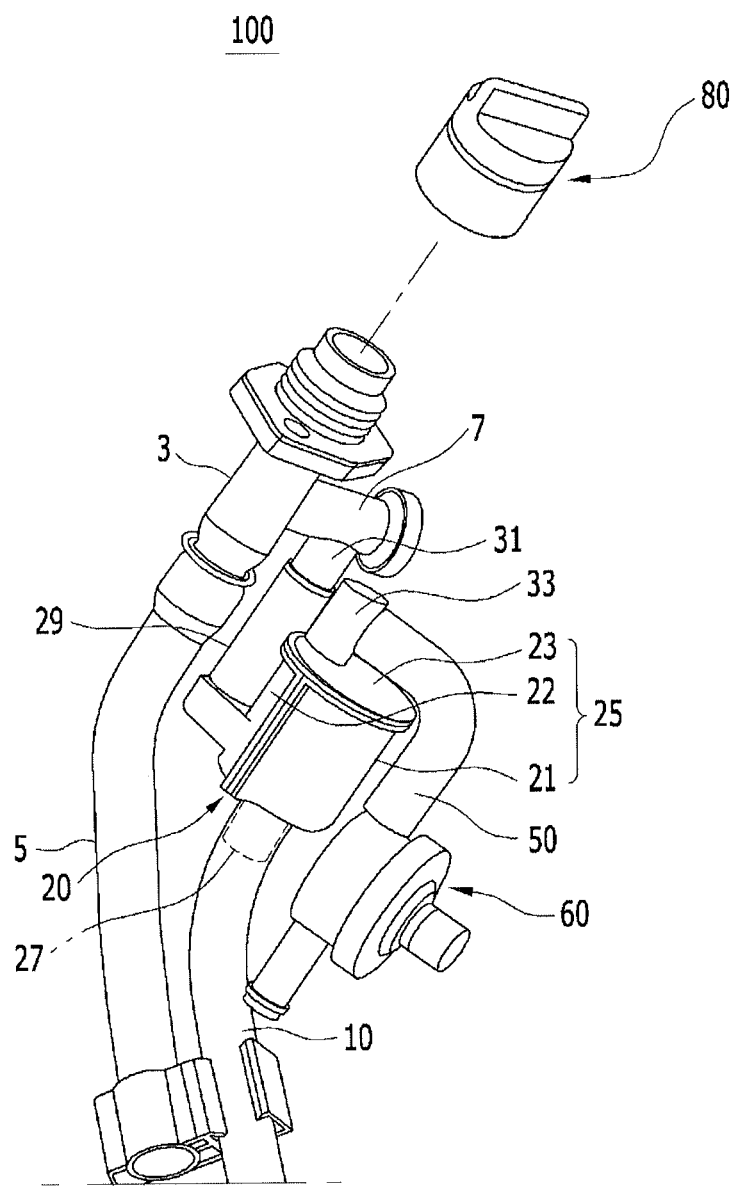
FIG. 2 is a perspective view illustrating an exemplary urea injection device for a selective catalyst reduction device according to the present invention.

FIG. 1 is a block diagram schematically illustrating a urea injection device for a selective catalyst reduction device according to various embodiments of the present invention, and FIG. 2 is a perspective view illustrating the urea injection device for a selective catalyst reduction device according to various embodiments of the present invention.

Referring to FIGS. 1 and 2, a urea injection device 100 for a selective catalyst reduction device according to various embodiments of the present invention may be applied to an exhaust gas after-treatment system for purifying exhaust gas that is discharged from an engine of a diesel vehicle. For example, the exhaust gas after-treatment system includes a selective catalyst reduction (hereinafter, referred to as 'SCR') device that reduces nitrogen oxide in exhaust gas discharged from the engine into nitrogen and oxygen.

Here, the SCR device has a structure in which an SCR catalyst is connected to and installed in an exhaust pipe that forms a stream of exhaust gas, and a reducing agent such as urea may be injected into the exhaust pipe through an injector or the like. Therefore, in the SCR device, when the reducing agent is injected into the exhaust pipe, the reducing agent is converted into ammonia by heat of the exhaust gas, and nitrogen oxide may be reduced into nitrogen gas and water by a catalyst reaction between nitrogen oxide and ammonia in the exhaust gas which is caused by the SCR catalyst.

Meanwhile, the SCR device is supplied with the urea through a urea supply system. The urea supply system includes a urea tank 1 which stores the urea, a urea injection device 100 according to various embodiments of the present invention for injecting the urea into the urea tank 1, and a pump for pumping the urea stored in the urea tank 1 to the SCR device.

The urea injection device 100 is also usually called a "urea filler neck" in the corresponding industrial field. The urea injection device 100 may inject a predetermined amount of urea into the urea tank 1 through a urea injection port 3, and a urea injection line 5 that connects the urea injection port 3 and the urea tank 1.

The urea injection device 100 for a selective catalyst reduction device according to various embodiments of the present invention has a structure which prevents ammonia gas (hereinafter, referred to as "urea gas") remaining in the urea tank 1 from being excessively emitted toward a user through the urea injection port 3 when the urea is injected at a high speed, and prevents contact between the urea and the atmosphere at ordinary times including the time when the urea is injected at a low speed.

In addition, the present invention provides the urea injection device 100 for a selective catalyst reduction device which may ensure stability of the urea injection to cope with an increase in a urea injection speed, and ensure pressure safety of the urea supply system in accordance with the urea injection. To this end, the urea injection device 100 for a selective catalyst reduction device according to various embodiments of the present invention basically includes a leveling pipe 10, a separator 20, a gas vent line 50, a check valve 60, and a cap unit 80.

The leveling pipe 10 serves to induce the shut-off of the urea injection, determine an injection amount of the urea, and discharge the urea gas in the urea tank 1 to the outside when the urea is injected, as widely known in the corresponding industrial field. The leveling pipe 10 is connected to the urea tank 1, e.g., an upper surface of the urea tank 1 through one end of the leveling pipe 10.

In some embodiments of the present invention, the separator 20 serves to separate urea gas and liquid in the urea tank 1 which flow in through the leveling pipe 10, discharge the urea gas to a gas recirculation line 31 and a gas vent line 50 that will be described below in more detail, and discharge the urea liquid to the leveling pipe 10.

Moreover, the separator 20 also serves to prevent the urea from being excessively injected after shutting off the urea injection, and prevent the urea liquid from leaking to the outside through the gas recirculation line 31 that will be described below in more detail.

The separator 20 may be installed to be connected with the leveling pipe 10, and may be connected to the urea injection port 3 through the gas recirculation line 31.

Figure 3:
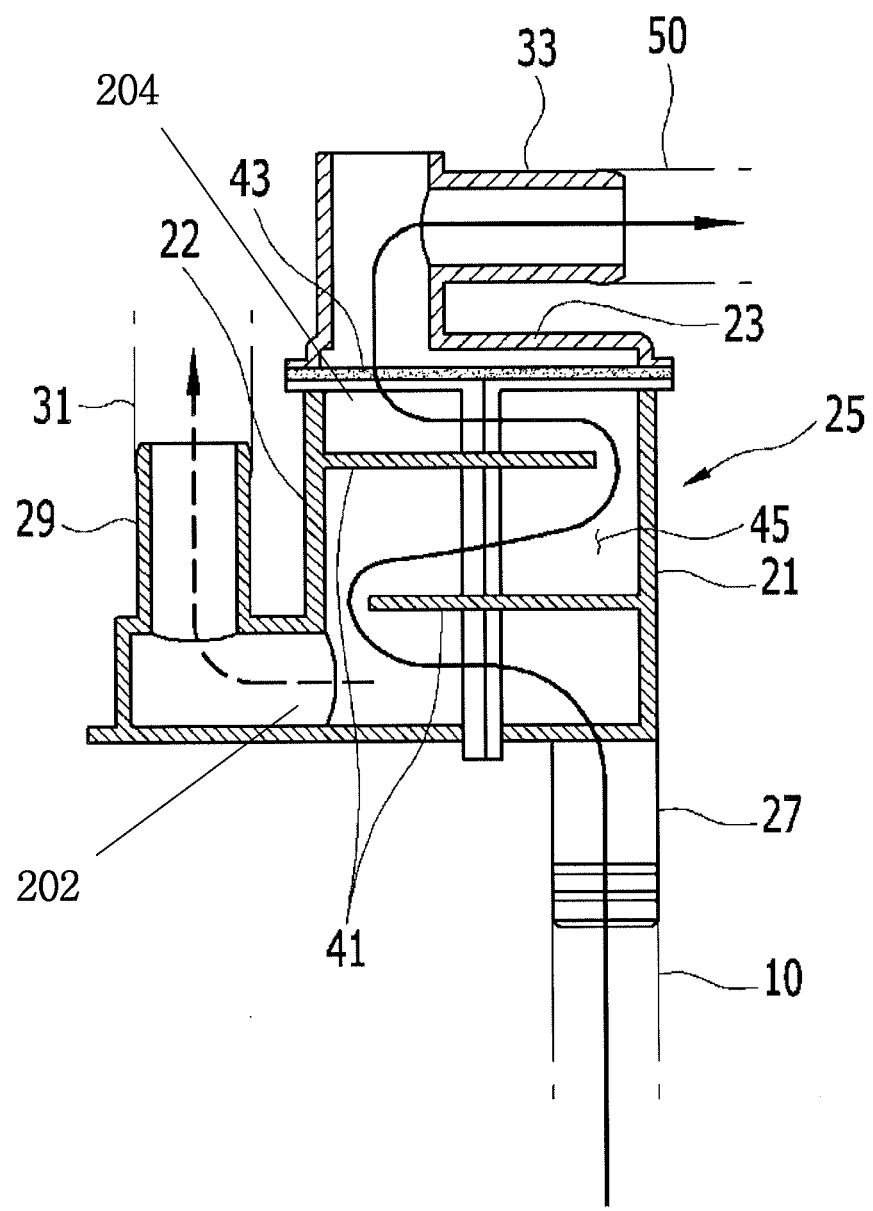
FIG. 3 is a cross-sectional configuration diagram schematically illustrating a separator that is applied to an exemplary urea injection device for a selective catalyst reduction device according to the present invention.

FIG. 3 is a cross-sectional configuration diagram schematically illustrating the separator that is applied to the urea injection device for a selective catalyst reduction device according to various embodiments of the present invention. Referring to FIG. 3 together with FIGS. 1 and 2, the separator 20 according to various embodiments of the present invention includes a case body 25 that includes a first body piece 21, a second body piece 22, and a third body piece 23. The case body 25 may be formed by coupling the first, second and third body pieces 21, 22 and 23 to each other.

The first body piece 21 is formed with an inlet 27 connected with the other end of the leveling pipe 10. The second body piece 22 is formed with a first gas outlet 29 connected with one end of the gas recirculation line 31. Further, the third body piece 23 is formed with a second gas outlet 33 connected with the gas vent line 50 that will be described below in more detail.

Here, the other end of the gas recirculation line 31 is connected to a connecting port 7 provided in the urea injection port 3. When the urea is injected at a low speed, the gas recirculation line 31 serves to recirculate all of the urea gas, which is separated by the separator 20, to the urea injection port 3 by using negative pressure that is applied in the urea injection port 3.

Further, when the urea is injected at a high speed, the gas recirculation line 31 serves to recirculate a part of the urea gas, which is separated by the separator 20, to the urea injection port 3 by using negative pressure that is applied in the urea injection port 3.

An internal space 202, which connects the inlet 27 and the first gas outlet 29, is formed in the case body 25. That is, the first and second body pieces 21 and 22 are coupled to each other so as to form the internal space, and an opening end 204 that is coupled to the third body piece 23. The opening end is upper end portions of the first and second body pieces 21 and 22 when viewed based on the drawing, and connected to the internal space of the body pieces 21 and 22.

Moreover, a plurality of partition walls 41 may be provided in the case body 25, and a hydrophobic mesh member 43 for separating the urea gas and liquid may be installed.

The partition walls 41 may be integrally connected or monolithically formed inside the second body piece 22, and disposed inside the first body piece 21. For example, a pair of partition walls 41 may be disposed inside the second body piece 22 so as to be spaced apart from each other at a predetermined interval.

Here, any one of the partition walls 41 may be connected to an inner surface of the second body piece 22 through one end thereof, and the other end thereof may be disposed to be spaced apart from an inner surface of the first body piece 21.

Further, one end of any other one of the partition walls 41 may be disposed to be spaced apart from the inner surface of the second body piece 22, and the other end thereof may be connected to the inner surface of the first body piece 21.

The aforementioned partition walls 41 act as resistive bodies that reduce a flow velocity of the urea gas and liquid that flow into the case body 25 along the leveling pipe 10 through the inlet 27 of the first body piece 21. In addition, the partition walls 41 may extend a flow path of the urea gas and liquid so as to reduce a flow velocity of the urea gas and liquid.

In this case, the first body piece 21 is partitioned by the partition walls 41, and is formed with a drain passage 45 that is connected to the inlet 27 of the first body piece 21 and the first gas outlet 29 of the second body piece 22. The drain passage 45 serves to drain the urea liquid, which is separated from the urea gas, to the inlet 27 of the first body piece 21.

The hydrophobic mesh member 43 serves to separate the urea gas and a part of the urea liquid in the urea tank 1 which flow into the case body 25 along the leveling pipe 10 through the inlet 27 of the first body piece 21. That is, the urea gas can pass through the hydrophobic mesh member 43, but the urea liquid cannot pass through the hydrophobic mesh member 43.

The hydrophobic mesh member 43 is installed between the internal space, which is formed by coupling the first and second body pieces 21 and 22, and the second gas outlet 33 of the third body piece 23. For example, the hydrophobic mesh member 43 has a plurality of fine mesh holes, and is installed in the third body piece 23 that is coupled to the opening ends of the first and second body pieces 21 and 22 which have been described above. That is, the hydrophobic mesh member 43 may close the opening ends when the third body piece 23 is coupled to the opening ends of the first and second body pieces 21 and 22.

The aforementioned hydrophobic mesh member 43 may be made of a hydrophobic material that has low ventilation resistance against the urea gas, and has high ventilation resistance against the urea liquid. Because the hydrophobic mesh member 43 is made of a hydrophobic material of a publicly known technology that is widely known in the corresponding industrial field, a specific description of the hydrophobic material will be omitted in the present specification.

As illustrated in FIGS. 1 and 2, in some embodiments of the present invention, when the urea is injected at a high speed, the gas vent line 50 serves to discharge the urea gas, into the atmosphere, which is discharged from the interior of the urea tank 1, flows into the separator 20 through the leveling pipe 10, and is separated from the urea liquid by the separator 20.

When the gas vent line 50 is connected with the separator 20, the gas vent line 50 is connected with the second gas outlet 33 of the third body piece 23. The gas vent line 50 has an inlet end, and an outlet end, and the inlet end is connected with the second gas outlet 33.

Further, the outlet end is an open end through which the urea gas is discharged into the atmosphere, and the outlet end is opened in a direction opposite to the urea injection port 3 so that the urea gas is not exposed (discharged) to the user.

Referring to FIGS. 1 and 2, in various embodiments of the present invention, the check valve 60 serves to selectively open or close a flow path of the gas vent line 50 depending on pressure of the urea gas that is discharged through the second gas outlet 33 of the third body piece 23.

That is, when the urea is injected at a high speed, the check valve 60 may open the flow path of the gas vent line 50 by the high-pressure urea gas that is discharged through the second gas outlet 33 of the third body piece 23. On the contrary, when the urea is injected at a low speed, the check valve 60 may close the flow path of the gas vent line 50 by the low-pressure urea gas that is discharged through the second gas outlet 33 of the third body piece 23.

Moreover, at ordinary times including the time when the urea is injected at a low speed, the check valve 60 according to various embodiments of the present invention also serves to close the gas vent line 50 so as to prevent contact between the urea in the urea tank 1 and the atmosphere, and to prevent moisture in the urea from escaping into the atmosphere.

Figure 4:
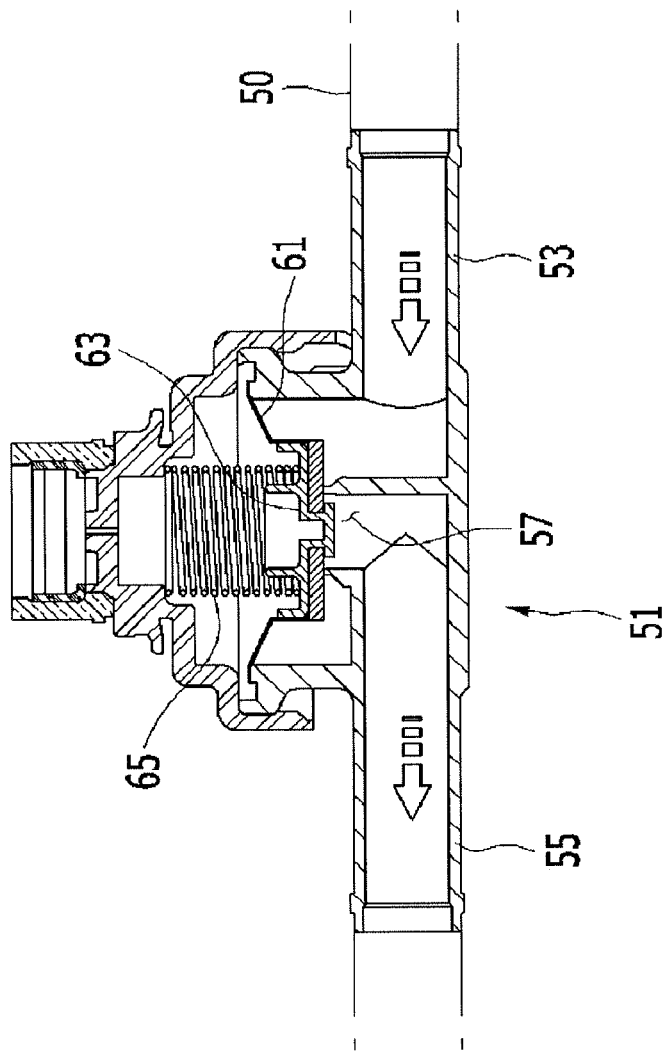
FIG. 4 is a cross-sectional configuration diagram schematically illustrating a check valve that is applied to an exemplary urea injection device for a selective catalyst reduction device according to the present invention.

FIG. 4 is a cross-sectional configuration diagram schematically illustrating the check valve that is applied to the urea injection device for a selective catalyst reduction device according to various embodiments of the present invention. Referring to FIG. 4 together with FIGS. 1 and 2, the check valve 60 according to various embodiments of the present invention is installed in the gas vent line 50, and includes a valve housing 51, a diaphragm 61, a valve body 63, and a spring 65.

When the urea is injected at a high speed, the valve housing 51 is formed with an inflow portion 53 through which the urea gas discharged from the separator 20 to the gas vent line 50 flows, an outflow portion 55 which is connected with the inflow portion 53 so as to allow the urea gas to be discharged therethrough, and a valve passage 57 which connects the inflow portion 53 and the outflow portion 55.

The diaphragm 61 may be one similar to a diaphragm of a publicly known technology which is elastically deformed by pressure of the urea gas, and fixed in the valve housing 51 so as to correspond to the valve passage 57.

The valve body 63 is fixedly installed on the diaphragm 61, and serves to selectively open or close the valve passage 57 by elastic deformation of the diaphragm 61. Further, the spring 65 is installed in the valve housing 51, and applies elastic force to the valve body 63.

Therefore, when the diaphragm 61 is elastically deformed by pressure of the urea gas, the valve body 63 opens the valve passage 57 while overcoming elastic force of the spring 65. Accordingly, the urea gas flowing into the inflow portion 53 of the valve housing 51 may be discharged along the valve passage 57 through the outflow portion 55, and emitted into the atmosphere through the outlet end of the gas vent line 50.

In addition, in a case in which the pressure of the urea gas is released at ordinary times or when the urea is injected at a low speed, the valve body 63 shuts off the inflow portion 53 and the outflow portion 55 of the valve housing 51 while closing the valve passage 57 by elastic force of the spring 65.

Referring to FIGS. 1 and 2, in some embodiments of the present invention, the cap unit 80 is coupled to the urea injection port 3 in a threaded connection manner in order to close the urea injection port 3, and includes a cap housing 71.

Figure 5:
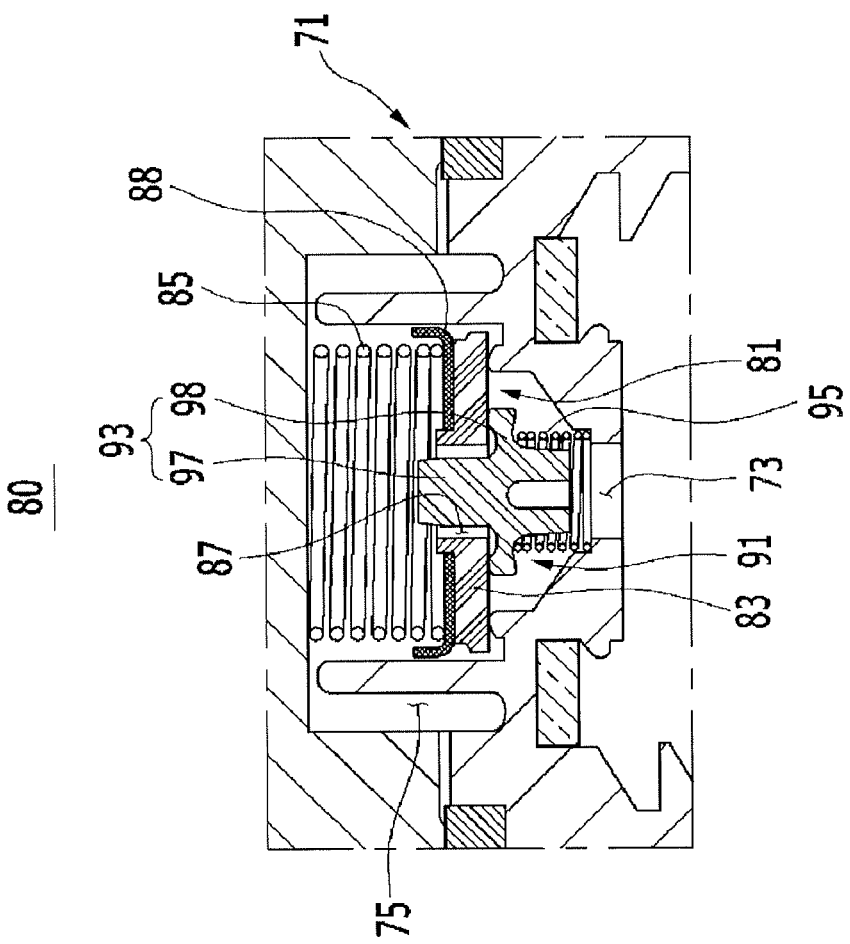
FIG. 5 is a cross-sectional configuration diagram schematically illustrating a cap unit that is applied to an exemplary urea injection device for a selective catalyst reduction device according to the present invention.

FIG. 5 is a cross-sectional configuration diagram schematically illustrating the cap unit that is applied to the urea injection device for a selective catalyst reduction device according to various embodiments of the present invention.

Referring to FIG. 5 together with FIGS. 1 and 2, in some embodiments of the present invention, a positive pressure valve 81 and a negative pressure valve 91, which serve to safely maintain pressure in the urea tank 1 by discharging the urea gas to the outside or sucking air in the atmosphere when abnormal pressure occurs in the urea tank 1, are installed in the cap housing 71.

To this end, the cap housing 71 is formed with a main valve passage 73 which is connected with the urea injection port 3, and a discharge passage 75 which is connected with the main valve passage 73 and discharges the urea gas to the outside.

In some embodiments of the present invention, when abnormal positive pressure occurs in the urea tank 1, the positive pressure valve 81 serves to discharge the urea gas in the urea tank 1 into the atmosphere through the discharge passage 75 while opening the main valve passage 73 by the positive pressure.

The positive pressure valve 81 includes a first opening and closing member 83, and a first valve spring 85. The first opening and closing member 83 is provided as a disk shaped valve body that selectively opens and closes the main valve passage 73.

The first opening and closing member 83 is installed inside the cap housing 71 so as to be in close contact with an edge surface of the main valve passage 73, and a sub valve passage 87 having a hole shape is formed in a central portion of the first opening and closing member 83.

The first valve spring 85 is installed inside the cap housing 71 so as to correspond to the first opening and closing member 83, and applies elastic force to the first opening and closing member 83. In this case, the first valve spring 85 is supported on a spring seat 88 disposed on an upper surface of the first opening and closing member 83, and applies elastic force against the first opening and closing member 83 in a downward direction toward the main valve passage 73.

Further, when abnormal negative pressure occurs in the urea tank 1, the negative pressure valve 91 serves to suck air in the atmosphere through the discharge passage 75 of the cap housing 71, which has been mentioned above, while opening the sub valve passage 87 of the first opening and closing member 83 by the negative pressure.

The negative pressure valve 91 includes a second opening and closing member 93, and a second valve spring 95. The second opening and closing member 93 is provided as a valve body that selectively opens and closes the sub valve passage 87 of the first opening and closing member 83.

The second opening and closing member 93 is integrally formed with a guide protrusion 97 which is fitted into the sub valve passage 87 of the first opening and closing member 83 with a clearance therebetween, and a ring shaped flange 98 which is in close contact with an edge surface of the sub valve passage 87 below the first opening and closing member 83.

The second valve spring 95 is installed below the first opening and closing member 83 inside the cap housing 71 so as to correspond to the second opening and closing member 93, and applies elastic force against the second opening and closing member 93 in an upward direction toward the first opening and closing member 83.

Here, the first opening and closing member 83 of the positive pressure valve 81 opens the main valve passage 73 while moving in the upward direction by the positive pressure in the urea tank 1, and the second opening and closing member 93 of the negative pressure valve 91 opens the sub valve passage 87 of the first opening and closing member 83 while moving in the downward direction by the negative pressure in the urea tank 1. That is, the first and second opening and closing members 83 and 93 may open and close the main valve passage 73 and the sub valve passage 87, respectively, while moving in opposite directions.

Hereinafter, operation of the urea injection device for a selective catalyst reduction device according to various embodiments of the present invention, which is configured as described above or the like, will be described in detail with reference to the aforementioned drawings and accompanying drawings.

Figure 6:
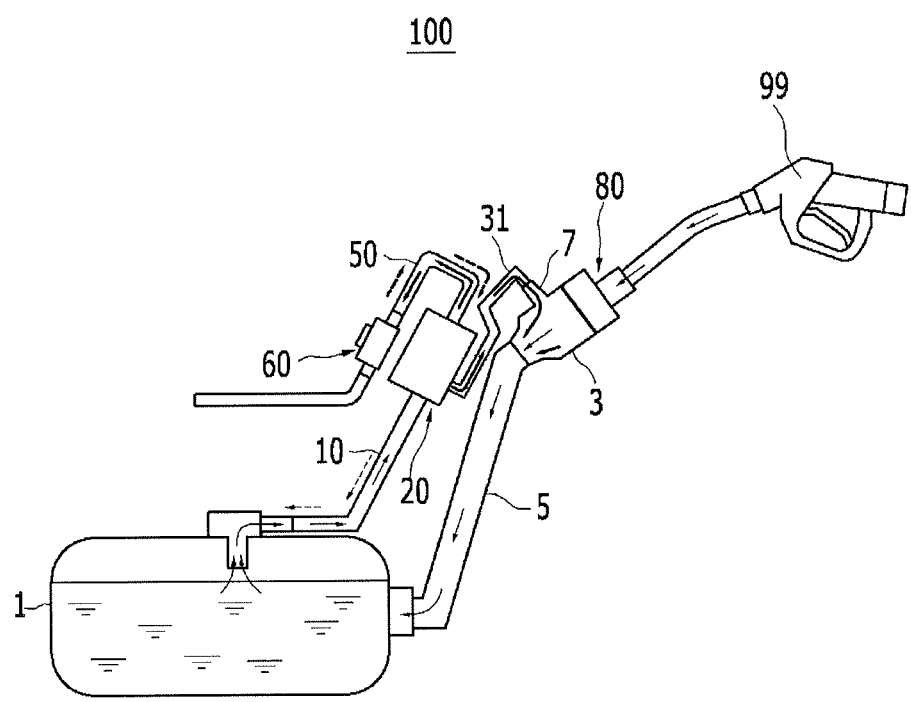
FIGS. 6 and 7 are views for explaining operation of an exemplary urea injection device for a selective catalyst reduction device according to the present invention.
Figure 7:
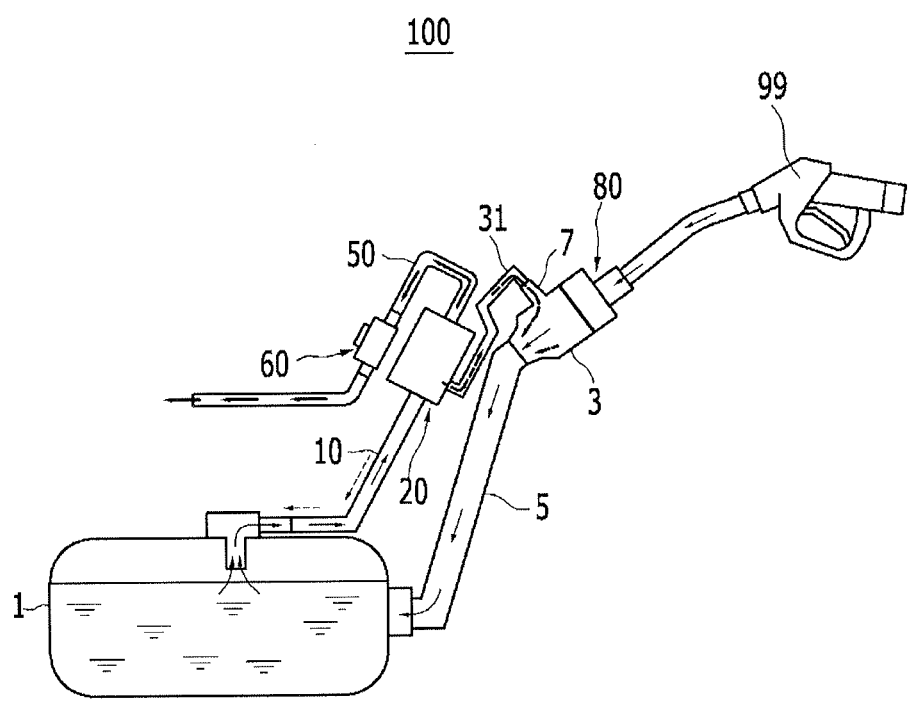

FIGS. 6 and 7 are views for explaining operation of the urea injection device for a selective catalyst reduction device according to various embodiments of the present invention. Referring to FIG. 6, in various embodiments of the present invention, at ordinary times or when the urea is injected at a low speed, the valve body 63 of the check valve 60 first closes the valve passage 57 by elastic force of the spring 65, and closes the flow path of the gas vent line 50 while shutting off the inflow portion 53 and the outflow portion 55 of the valve housing 51.

Therefore, in various embodiments of the present invention, at ordinary times or when the urea is injected at a low speed, the flow path of the gas vent line 50 is closed by the check valve 60, and contact between the urea in the urea tank 1 and the atmosphere is prevented, thereby preventing moisture in the urea from escaping into the atmosphere. Accordingly, the present invention may prevent deterioration and inferiority of the urea concentration of the urea solution, and may prevent the urea from becoming frozen in the winter.

Meanwhile, in the case in which the urea is injected into the urea tank 1 at a low speed, in various embodiments of the present invention, an injection gun 99 is fitted with the urea injection port 3 in a state in which the cap unit 80 is detached from the urea injection port 3, and the urea is injected through the injection gun 99 at a low speed, such that the urea may be injected into the urea tank 1 through the urea injection line 5.

In this process, the urea gas and a part of the urea liquid in the urea tank 1 flow into the separator 20 through the leveling pipe 10. That is, the urea gas and the urea liquid flow into the internal space of the first and second body pieces 21 and 22 through the inlet 27 of the case body 25 while flowing along the leveling pipe 10.

As described above, the urea gas and the urea liquid flowing into the internal space of the first and second body pieces 21 and 22 of the case body 25 pass between the partition walls 41, thereby reducing a flow velocity.

In this case, the urea gas and the urea liquid are separated from each other by the hydrophobic mesh member 43, and a part of the urea gas is discharged from the internal space of the first and second body pieces 21 and 22 through the first gas outlet 29 of the second body piece 22, and flows into the urea injection port 3 through the gas recirculation line 31.

Then, a part of the urea gas flows into the urea tank 1 through the urea injection line 5 by negative pressure that is applied in the urea injection port 3.

During this process, a remnant of the urea gas is discharged from the internal space of the first and second body pieces 21 and 22 through the second gas outlet 33 of the third body piece 23, and flows into the gas vent line 50.

Here, because the flow path of the gas vent line 50 is in a closed state by the check valve 60, the remnant of the urea gas may be discharged from the internal space of the first and second body pieces 21 and 22 through the first gas outlet 29 of the second body piece 22, and may flow into the urea injection port 3 through the gas recirculation line 31.

That is, when the urea is injected into the urea tank 1 at a low speed, all of the urea gas, which is discharged from the interior of the urea tank 1, may be recirculated to the urea injection port 3 by the aforementioned process.

Further, the urea liquid separated by the hydrophobic mesh member 43 in the internal space of the first and second body pieces 21 and 22 may be stored in the drain passage 45 in the first body piece 21 that is partitioned by the partition walls 41, may be discharged from the drain passage 45 through the inlet 27 of the first body piece 21, and may flow into the urea tank 1 through the leveling pipe 10.

Meanwhile, as illustrated in FIG. 7, in various embodiments of the present invention, when a large amount of urea is injected into the urea tank 1 at a high speed, the urea gas and liquid discharged with high pressure from the interior of the urea tank 1 may be separated from each other by the separator 20, through the process as described above.

In this case, as described above, the urea liquid may be discharged from the drain passage 45 of the separator 20 through the inlet 27, and may flow into the urea tank 1 through the leveling pipe 10.

Further, a part of the urea gas may be discharged from the internal space of the first and second body pieces 21 and 22 through the first gas outlet 29 of the second body piece 22, and may flow into the urea injection port 3 through the gas recirculation line 31.

A remnant of the urea gas flows in through the gas vent line 50, and flows into the inflow portion 53 of the check valve 60 in this process. Because the urea gas forms high pressure, the urea gas elastically deforms the diaphragm 61 in the valve housing 51.

When the diaphragm 61 is elastically deformed by pressure of the urea gas as described above, the valve body 63 opens the valve passage 57 while overcoming elastic force of the spring 65. Therefore, the urea gas flowing into the inflow portion 53 of the valve housing 51 is discharged along the valve passage 57 through the outflow portion 55, and emitted into the atmosphere through the outlet end of the gas vent line 50.

Here, the urea gas may be discharged through the outlet end of the gas vent line 50 in a direction opposite to the urea injection port 3.

Therefore, in various embodiments of the present invention, when the urea is injected at a high speed, the high pressure urea gas remaining in the urea tank 1 is discharged through the outlet end of the gas vent line 50 in the direction opposite to the urea injection port 3, thereby minimizing the urea gas that is discharged to the urea injection port 3.

In addition, in various embodiments of the present invention, the high-pressure urea gas is discharged through the outlet end of the gas vent line 50 in the direction (a direction far away from the user) opposite to the urea injection port 3, thereby preventing the urea gas from being exposed to the user and flowing into the respiratory system of the user.

Moreover, in various embodiments of the present invention, when the urea is injected as described above, the urea gas and liquid discharged from the urea tank 1 may be separated by the separator 20, the urea gas may be recirculated to the urea injection port 3 or discharged into the atmosphere, and the urea liquid may be drained into the urea tank 1.

Accordingly, by the separator 20, the present invention may prevent the urea from being excessively injected after shutting off urea injection, and may prevent the urea liquid from leaking to the outside through the gas recirculation line 31.

Meanwhile, in various embodiments of the present invention, in a case in which abnormal pressure occurs in the urea tank 1 at ordinary times in a state in which the cap unit 80 is coupled to the urea injection port 3, pressure in the urea tank 1 may be safely maintained by the positive pressure valve 81 and the negative pressure valve 91 of the cap unit 80 (hereinafter, see FIG. 5).

For example, when abnormal positive pressure occurs in the urea tank 1, the first opening and closing member 83 of the positive pressure valve 81 moves in the upward direction by the positive pressure while overcoming elastic force of the first valve spring 85, opens the main valve passage 73, and discharges the urea gas in the urea tank 1 into the atmosphere through the discharge passage 75 of the cap housing 71.

Further, when abnormal negative pressure occurs in the urea tank 1, the second opening and closing member 93 of the negative pressure valve 91 may move in the downward direction by the negative pressure while overcoming elastic force of the second valve spring 95, open the sub valve passage 87 of the first opening and closing member 83, and allow air in the atmosphere to flow into the urea tank 1 through the discharge passage 75.

Therefore, in various embodiments of the present invention, when abnormal pressure occurs in the urea tank 1, pressure in the urea tank 1 may be safely maintained by the positive pressure valve 81 and the negative pressure valve 91 of the cap unit 80, thereby ensuring stability of the urea injection to cope with an increase in a urea injection speed, and ensuring pressure safety of the urea supply system in accordance with the urea injection.

For convenience in explanation and accurate definition in the appended claims, the terms "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A urea injection device for a selective catalyst reduction device, which injects urea into a urea tank through a urea injection port and a urea injection line that connects the urea injection port and the urea tank, the urea injection device comprising:
   a leveling pipe connected with the urea tank;
   a separator installed to be connected with the leveling pipe, and connected to the urea injection port through a gas recirculation line;
   a gas vent line connected with the separator; and
   a check valve installed in the gas vent line, wherein the check valve is separately mounted from the separator,
   wherein the separator includes:
      a case body formed with an inlet connected with the leveling pipe,
      a first gas outlet connected with the gas recirculation line, and
      a second gas outlet connected with the gas vent line,
   wherein a hydrophobic mesh member, which separates urea gas from urea liquid, is installed in the case body,
   wherein an internal space, which connects the inlet and the first gas outlet, is formed in the case body,
   wherein the hydrophobic mesh member is installed between the internal space and the second gas outlet, and
   wherein a plurality of partition walls is provided in the case body, the case body includes a first body piece which is formed with the inlet, a second body piece which is formed with the first gas outlet, and a third body piece which is formed with the second gas outlet,
   wherein the first and second body pieces are coupled to each other to form an internal space, and an opening end that is coupled to the third body piece,
   wherein the plurality of partition walls includes:
      a first partition wall, which is disposed inside the first body piece, and
      a second partition wall, which is disposed inside the second body piece, wherein the first partition wall and the second partition wall are spaced apart from each other inside the case body.

2. The urea injection device of claim 1, wherein the first body piece is partitioned by the partition walls, and is formed with a drain passage connected with the inlet.

3. The urea injection device of claim 1, wherein the hydrophobic mesh member, which is hydrophobic and closes the opening end, is installed in the third body piece.

4. The urea injection device of claim 1, wherein the check valve includes:
   a valve housing which is formed with an inflow portion through which urea gas flows, an outflow portion through which the urea gas is discharged, and a valve passage which connects the inflow portion and the outflow portion;
   a diaphragm which is fixed in the valve housing to correspond to the valve passage, and is capable of being elastically deformed by pressure of the urea gas;
   a valve body which is fixed to the diaphragm, and selectively opens or closes the valve passage; and
   a spring which is installed in the valve housing, and applies elastic force to the valve body.

5. The urea injection device of claim 1, wherein:
   an inlet end of the gas vent line is connected with the separator, and
   an outlet end of the gas vent line connected with the check valve is opened in a direction that the check valve is located.

6. The urea injection device of claim 1, wherein the separator:
   separates urea gas and urea liquid from each other that flow in through the leveling pipe,
   discharges the urea gas to the gas recirculation line and the gas vent line, and
   discharges the urea liquid to the leveling pipe.

7. The urea injection device of claim 6, wherein the check valve selectively opens or closes a flow path of the gas vent line depending on pressure of the urea gas.

8. The urea injection device of claim 1, further comprising:
   a cap unit which is coupled to the urea injection port.

9. The urea injection device of claim 8, wherein a positive pressure valve and a negative pressure valve are installed in the cap unit.

10. The urea injection device of claim 9, wherein the cap unit includes a cap housing that is formed with a main valve passage which is connected with the urea injection port, and a discharge passage which is connected with the main valve passage and discharges the urea gas.

11. The urea injection device of claim 10, wherein:
the positive pressure valve includes a first opening and closing member which has a sub valve passage connected with the main valve passage and selectively opens or closes the main valve passage, and a first valve spring which is installed in the cap housing and applies elastic force to the first opening and closing member, and
the negative pressure valve includes a second opening and closing member which selectively opens or closes the sub valve passage, and a second valve spring which is installed in the cap housing and applies elastic force to the second opening and closing member.

12. The urea injection device of claim 11, wherein:
the first opening and closing member is installed to be in close contact with an edge of the main valve passage, and
the second opening and closing member is installed to be in close contact with an edge of the sub valve passage.

13. The urea injection device of claim 12, wherein the first and second opening and closing members move in opposite directions, and open or close the main valve passage and the sub valve passage, respectively.

* * * * *